(12) United States Patent
Ueda et al.

(10) Patent No.: US 6,297,770 B1
(45) Date of Patent: Oct. 2, 2001

(54) GLOBAL POSITIONING SYSTEM AND GLOBAL POSITIONING METHOD WITH IMPROVED SENSITIVITY BY DETECTING NAVIGATION DATA INVERSION BOUNDARIES

(75) Inventors: Fumio Ueda; Seiichiro Hirata, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/576,027

(22) Filed: May 23, 2000

(51) Int. Cl.7 .................................................. H04B 7/185
(52) U.S. Cl. ............................. 342/357.12; 342/357.05; 342/357.06; 701/213
(58) Field of Search ..................... 342/357.05, 357.06, 342/357.12, 357.13; 701/213; 455/12.1

(56) References Cited

U.S. PATENT DOCUMENTS

| 5,579,014 | 11/1996 | Brooksby et al. . |
| 5,663,734 | 9/1997 | Krasner . |
| 6,081,691 | * 6/2000 | Renard et al. .................... 455/12.1 |

FOREIGN PATENT DOCUMENTS

| 61-200484 | 6/1986 | (JP) . |
| 61-167813 | 7/1986 | (JP) . |
| 99/44073 | 9/1999 | (WO) . |
| 00/14569 | 3/2000 | (WO) . |

* cited by examiner

*Primary Examiner*—Dao Phan
(74) *Attorney, Agent, or Firm*—Leydig, Voit & Mayer, Ltd.

(57) ABSTRACT

A Global Positioning System (GPS) forms a C/A code sequence by summing, beginning from a polarity inversion boundary determined by a correlation peak position detector, chips at corresponding positions in PN frames constituting each bit of navigation data; calculates pseudo ranges by computing correlation between the C/A code sequence and a reference C/A code sequence generated by the GPS terminal; and determines the position of the GPS terminal using the pseudo ranges and navigation data. The navigation data detected inside the GPS terminal is used when a received electric field detected by a received electric field intensity detector is greater than a threshold level, and the navigation data received from an external system is used when the received electric field is below the threshold level. Thus, the number of PN frames to be integrated is limited because the polarity inversion boundaries of the navigation data are detected, and hence the sensitivity (S/N ratio) is sufficient. Communication between a terminal and a base station is not always required for determining the position because the GPS terminal does not always obtain the Doppler information from the base station, reducing communication cost.

14 Claims, 15 Drawing Sheets

GLOBAL POSITIONING SYSTEM AND GLOBAL POSITIONING METHOD WITH IMPROVED SENSITIVITY BY DETECTING NAVIGATION DATA INVERSION BOUNDARIES

BACKGROUND OF THE INVENTION

1. Field of the Invention

The present invention relates to a Global Positioning System GPS and a Global Positioning method for precisely determining a location by receiving GPS signals from satellites.

2. Description of Related Art

Many satellites orbit the earth, and continuously transmit radio waves at a carrier frequency of 1575.42 GHz. The radio waves are phase modulated by pseudo-random sequences, and a unique pattern is assigned to each satellite so that the different radio waves can be easily identified. As a typical pseudo-random sequence, is known a regularly modulated code pattern called a C/A code (clear and acquisition code) available to the public. Furthermore, the radio waves carry navigation data necessary for users to perform positioning, such as satellite orbit information, satellite correction data, correction coefficients of the ionosphere, etc. The navigation data are transmitted by means of polarity inversions in the C/A code sequence.

FIG. 13 is a diagram showing the C/A code sequence. As shown in FIG. 13, the C/A code sequence is a regularly arranged code sequence with its data consisting of 20 PN frames, each which consists of 1023 bits of one millisecond long. Thus, the navigation data is a 50 bit per second signal consisting of 1000 PN frames per second. The polarity of the C/A code sequence is reversed in accordance with the polarity of the bits of the navigation data.

FIG. 14 is a block diagram showing a configuration of a conventional Global Positioning System disclosed in U.S. Pat. No. 5,663,734. In this figure, the reference numeral 101 designates a base station having a GPS receiving antenna 102 and a transmitting and receiving antenna 103. The reference numeral 104 designates a remote unit.

The remote unit 104 comprises an RF (radio frequency) to IF (intermediate frequency) converter 106 with a GPS receiving antenna 105; an A/D converter 107 for converting the analog signal from the converter 106 to a digital signal; a memory (digital snapshot memory) 108 for recording the output of the A/D converter 107; and a general purpose programmable digital signal processor 109 (called DSP from now on) for processing the signal fed from the memory 108.

The remote unit 104 further comprises a program EPROM 110 connected to the DSP 109, a frequency synthesizer 111, a power regulator 112, a write address circuit 113, a microprocessor 114, a RAM (memory) 115, an EEPROM 116, and a modem 118 which has a transmitting and receiving antenna 117, and is connected to the microprocessor 114.

Next, the operation of the conventional GPS will be described.

The base station 101 commands the remote unit 104 to perform a measurement via a message transmitted over a data communication link 119. The base station 101 also sends within this message Doppler information for the satellites in view, which is a form of satellite data information. This Doppler information typically is in the format of frequency information, and the message will specify an identification of the particular satellites in view. This message is received by the modem 118 in the remote unit 104, and is stored in the memory 108 connected to the microprocessor 114.

The microprocessor 114 handles data information transfer between the modem 118 and the DSP 109 and write address circuit 113, and controls the power management functions in the remote unit 104.

Once the remote unit 104 receives a command (e.g., from the base station 101) for GPS processing together with the Doppler information, the microprocessor 114 activates the RF to IF converter 106, A/D converter 107 and memory 108 via the power regulator 112 and controlled power lines 120a–120d, thereby providing full power to these components. This causes the signal from the GPS satellite which is received by the antenna 105 to be down-converted to an IF frequency, followed by conversion to digital data.

A contiguous set of such data, typically corresponding to a duration of 100 milliseconds to one second (or even longer), is stored in the memory 108.

Pseudo range calculation is executed by the DSP 109 that uses a fast Fourier transform (FFT) algorithm, which permits very rapid computation of the pseudo ranges by performing quickly a large number of correlation operations between a locally generated reference and the received signals. The fast Fourier transform algorithm permits a simultaneous and parallel search of all positions, thus speeding up the required computation process.

Once the DSP 109 completes its computation of the pseudo ranges for each of the in view satellites, it transmits this information to the microprocessor 114 through an interconnect bus 122.

Then, the microprocessor 114 utilizes the modem 118 to transmit the pseudo range data over the data link 119 to the base station 101 for final position computation.

In addition to the pseudo data, a time lag may simultaneously be transmitted to the base station 101 that indicates the elapsed time from the initial data collection in the memory 108 to the time of transmission over the data link 119. This time lag improves the capability of the base station 101 to perform position calculation, since it allows the computation of the GPS satellite positions at the time of data collection.

The modem 118 utilizes a separate transmitting and receiving antenna 117 to transmit and receive messages over the data link 119. The modem 118 includes a communication receiver and a communication transmitter, which are alternately connected to the transmitting and receiving antenna 117. Similarly, the base station 101 may use a separate antenna 103 to transmit and receive data link messages, thus allowing continuous reception of GPS signals via the GPS receiving antenna 102 at the base station 101.

It is expected that the position calculations in the DSP 109 will require less than a few seconds of time, depending upon the amount of the data stored the memory 108 and the speed of the DSP 109 or several DSPs.

As described above, the memory 108 captures a record corresponding to a relatively long period of time. The efficient processing of this large block of data using fast convolution methods contributes to the ability to process signals at low received levels such as when reception is poor due to partial blockage from buildings, trees etc.

All pseudo ranges for visible GPS satellites are computed using the same buffered data. This provides improved performance relative to continuous tracking GPS receivers in situations such as urban blockage conditions in which the signal amplitude is rapidly changing.

The signal processing carried out by the DSP 109 will now be described with reference to FIG. 13. The objective of the processing is to determine the timing of the received waveform with respect to a locally generated waveform. Furthermore, in order to achieve high sensitivity, a very long portion of such a waveform, typically 100 milliseconds to one second, is processed.

The received GPS signal (C/A mode) is constructed from a high rate (1 MHz) repetitive pseudo random (PN) pattern (PN frame) of 1023 symbols, and successive PN frames are added to one another. For example, there are 1000 PN frames over a period of one second. The first such frame is coherently added to the next frame, the result added to the third frame, followed by the additions as shown in FIGS. 15(A)–15(E). The result is a signal having a duration of one PN frame (=1023 chips). The phase of this sequence is compared to a local reference sequence to determine the relative timing between the two, thus establishing the pseudo range.

With the foregoing configuration, the conventional Global Positioning System carries out preprocessing operation which precedes the correlation calculations, and which is called "preliminary integration of the received GPS signal" to implement high sensitivity. In this process, the preliminary integration is carried out for 5–10 PN frames to avoid reduction in the integrals due to polarity inversions in the navigation data.

The C/A code sequence in the GPS received signal can change its phases, that is, have polarity inversions at the transitions of the bits of the navigation. Therefore, the signal components (chips) may cancel out each other in the integration (cumulative summing) process because of the polarity inversions at the bits of the navigation data in the C/A code sequence, hindering sufficient improvement in the sensitivity (S/N ratio).

In other words, the conventional system does not detect the polarity inversions in the navigation data.

This limits the theoretical number of data to be integrated, and hence presents a problem of providing only insufficient improvement in the sensitivity (S/N ratio).

In addition, every time it determines its position (called "positioning" from now on), the remote unit functioning as a terminal collects Doppler information from the base station, calculates pseudo ranges to the visible satellites, and determines its position by transmitting the distance information to the server. Thus, the positioning always requires communication with the server, offering a problem of entailing communication cost.

SUMMARY OF THE INVENTION

The present invention is implemented to solve the foregoing problems. It is therefore an object of the present invention to provide a highly sensitive Global Positioning System and Global Positioning method that can reduce the communication cost by limiting communications with a server only to a case where the receiving sensitivity is insufficient, and that can achieve stable reception inside buildings or in the blockage therefrom.

According to a first aspect of the present invention, there is provided a Global Positioning System including an external system that receives a GPS signal from a satellite and extracts navigation data and Doppler information from the GPS signal, and a GPS terminal that is connected to the external system through a communication medium and receives the GPS signal from the satellite, wherein each bit of the navigation data consists of a plurality of PN frames each of which consists of many chips arranged in a prescribed pattern, the GPS terminal comprising: a frequency converter for converting a frequency of the GPS signal received by the GPS terminal; an A/D converter for converting the GPS signal passing through the frequency conversion into corresponding GPS data; a memory for storing the GPS data for a predetermined time interval; a Doppler correction section for performing Doppler correction of the stored GPS data using Doppler information one of the GPS terminal and the external system obtains; means for sequentially dividing the GPS data subjected to the Doppler correction into a plurality of data blocks with a length of a navigation data bit in accordance with navigation data supplied from one of the GPS terminal and the external system; means for calculating in each of the data blocks a cumulative sum of chips at corresponding positions in individual PN frames in the data block; means for multiplying each cumulative sum by a corresponding navigation data bit, and for outputting a plurality of products; means for summing up the plurality of products at respective chip positions; and means for computing correlation between a set of sums of the products and a PN code sequence generated in the GPS terminal, and for calculating a pseudo range between the GPS terminal and the satellite from a correlation peak position at which the correlation becomes maximum.

Here, the Global Positioning System may further comprise means for shifting divisions of the data blocks if the correlation peak is less than a prescribed level, and for supplying new data blocks to the means for calculating a cumulative sum.

The means for shifting divisions of the data blocks may further shift the divisions to maximize the correlation, and the means for computing correlation may determine the pseudo range from the correlation peak position.

The Global Positioning System may further comprise a received electric field detector for detecting intensity of a received electric field, wherein the means for sequentially dividing the GPS data may divide, when the received electric field is greater than a predetermined level, the GPS data passing through the Doppler correction into the data blocks in accordance with the navigation data obtained from the GPS signal received by the GPS terminal, and may divide, when the received electric field is less than the predetermined level, the GPS data in accordance with the navigation data supplied from the external system.

The Global Positioning System may further comprise a position determining section for determining a position of the GPS terminal from the pseudo ranges and the navigation data which is extracted from the GPS signal received by the GPS terminal when the received electric field is greater than a prescribed level, and which is supplied from the external system when the received electric field is less than the prescribed level.

The GPS terminal may further comprise a position determining section for determining a position of the GPS terminal from the pseudo ranges obtained by the GPS terminal and the navigation data received by the external system.

The means for shifting divisions of the data blocks may shift the divisions of the data blocks by a predetermined amount if the correlation peak value is less than a prescribed level to enable detection of the correlation peak position.

The means for shifting divisions of the data blocks may shift the divisions of the data blocks roughly at a first step, and then slightly at a second step to converge to the correlation peak value.

The Doppler correction section may carry out the Doppler correction of the C/A code sequence in the GPS signal received by the GPS terminal using the Doppler information obtained from the navigation data supplied by one of the GPS terminal and the external system.

The Doppler correction section may carry out the Doppler correction of the C/A code sequence by performing the Doppler correction on the GPS signal received by the GPS terminal.

The received electric field detector may change a correlation calculation interval in response to the electric field level detected.

The received electric field detector may change a summation interval in response to the electric field level detected.

According to a second aspect of the present invention, there is provided a GPS terminal connected through a communication medium to an external system that receives a GPS signal from a satellite and extracts navigation data and Doppler information from the GPS signal, wherein the GPS terminal receives the GPS signal from the satellite, and each bit of the navigation data consists of a plurality of PN frames each of which consists of many chips arranged in a prescribed pattern, the GPS terminal comprising: a frequency converter for converting a frequency of the GPS signal received by the GPS terminal; an A/D converter for converting the GPS signal passing through the frequency conversion into corresponding GPS data; a memory for storing the GPS data for a predetermined time interval; a Doppler correction section for performing Doppler correction of the stored GPS data using Doppler information one of the GPS terminal and the external system obtains; means for sequentially dividing the GPS data subjected to the Doppler correction into a plurality of data blocks with a length of a navigation data bit in accordance with navigation data supplied from one of the GPS terminal and the external system; means for calculating in each of the data blocks a cumulative sum of chips at corresponding positions in individual PN frames in the data block; means for multiplying each cumulative sum by a corresponding navigation data bit, and for outputting a plurality of products; means for summing up the plurality of products at respective chip positions; and means for computing correlation between a set of sums of the products and a PN code sequence generated in the GPS terminal, and for calculating a pseudo range between the GPS terminal and the satellite from a correlation peak position at which the correlation becomes maximum.

According to a third aspect of the present invention, there is provided a Global Positioning method in a system including an external system that receives a GPS signal from a satellite and extracts navigation data and Doppler information from the GPS signal, and a GPS terminal that is connected to the external system through a communication medium and receives the GPS signal from the satellite, wherein each bit of the navigation data consists of a plurality of PN frames each of which consists of many chips arranged in a prescribed pattern, the Global Positioning method comprising the steps of: converting a frequency of the GPS signal received by the GPS terminal; carrying out A/D conversion of the GPS signal passing through the frequency conversion into corresponding GPS data; storing the GPS data for a predetermined time interval; performing Doppler correction of the stored GPS data using Doppler information one of the GPS terminal and the external system obtains; sequentially dividing the GPS data subjected to the Doppler correction into a plurality of data blocks with a length of a navigation data bit in accordance with navigation data supplied from one of the GPS terminal and the external system; calculating in each of the data blocks a cumulative sum of chips at corresponding positions in individual PN frames in the data block; multiplying each cumulative sum by a corresponding navigation data bit, and for outputting a plurality of products; summing up the plurality of products at respective chip positions; computing correlation between a set of sums of the products and a PN code sequence generated in the GPS terminal; and calculating a pseudo range between the GPS terminal and the satellite from a correlation peak position at which the correlation becomes maximum.

DETAILED DESCRIPTION OF THE PREFERRED EMBODIMENTS

The invention will now be described with reference to the accompanying drawings.

Embodiment 1

Figure 1:
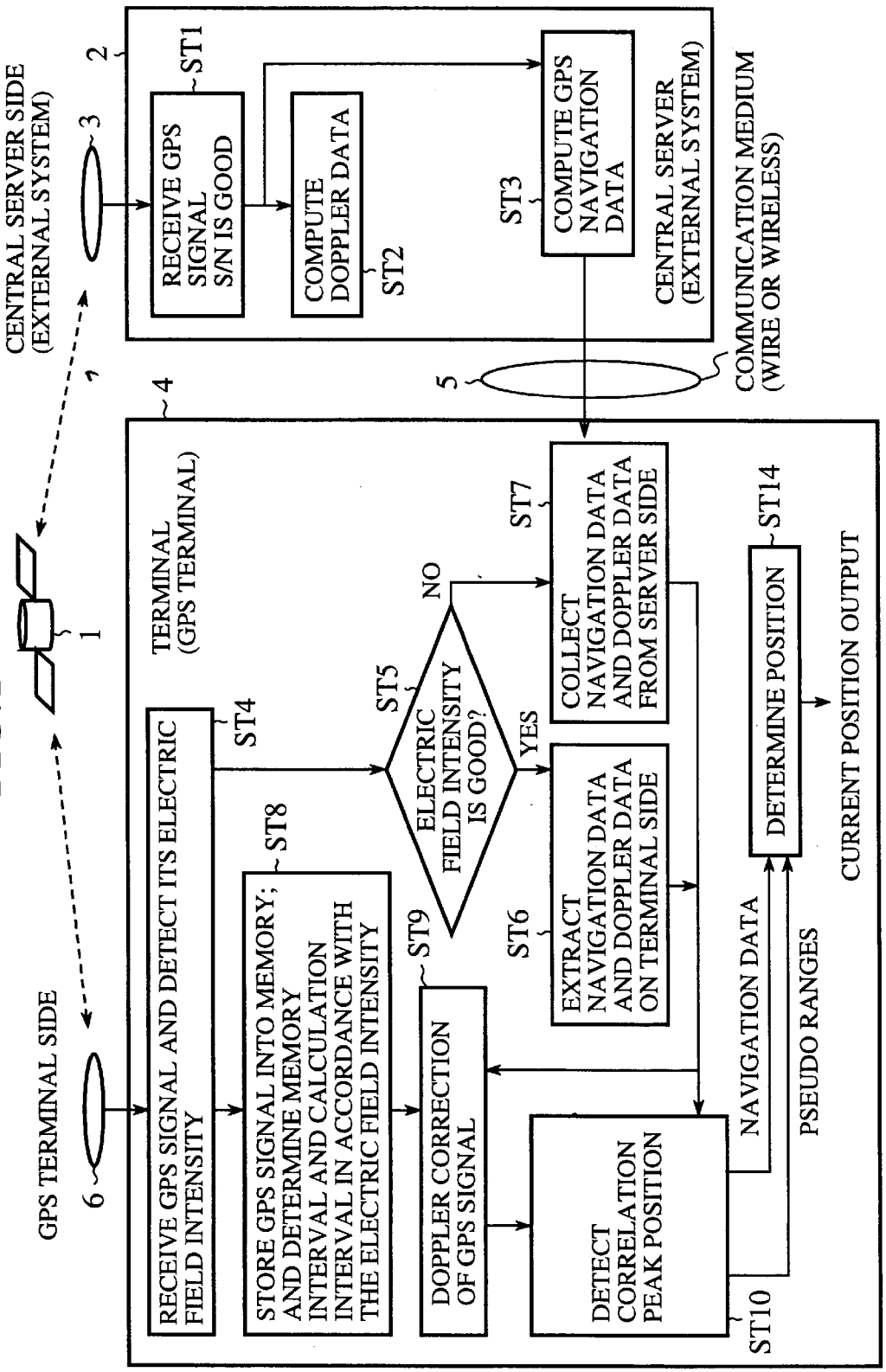
FIG. 1 is a block diagram showing an outline of the operation of an embodiment 1 of the Global Positioning System and Global Positioning method in accordance with the present invention.

FIG. 1 is a block diagram showing an outline of the operation of an embodiment 1 of the Global Positioning System and Global Positioning method in accordance with the present invention. In this figure, the reference numeral 1 designates a satellite in view; 2 designates a central server as an external system; and 4 designates a terminal connected to the central server 2 via a wire or wireless communication medium 5. The central server 2 has a receiving antenna 3 installed in a vantage location for receiving a GPS signal from the satellite in view 1, and extracts navigation data and Doppler data from the GPS signal. The terminal 4 comprises a receiving antenna 6 for receiving the GPS signal from the satellite 1.

Next, an outline of the operation of the present embodiment 1 will be described.

First, receiving the GPS signal from the receiving antenna 3 installed in a vantage location, the central server 2 makes a decision as to whether the S/N ratio is good or not (step ST1), calculates Doppler data (step ST2) and calculates GPS navigation data (step ST3).

On the other hand, the terminal 4 detects the intensity of the electric field received by the receiving antenna 6 (step ST4), and makes a decision as to whether the received electric field is good or not (step ST5). If the decision result is positive (YES), the terminal 4 extracts navigation data and Doppler data on the terminal side (step ST6), whereas if the decision result is negative (NO), the terminal 4 collects required navigation data and Doppler data from the central server 2 (step ST7). Subsequently, the terminal 4 determines a memory interval and a calculation interval in accordance with the received electric field intensity, and stores the received GPS signal in the memory (step ST8).

After that, the terminal 4 makes the Doppler correction of the received GPS signal (step ST9), divides the data by the navigation data bit length, detects points at which a correlation value takes maximum value by a correlation peak position detector (step ST10), and obtains a pseudo range from the peak position. The terminal 4 carries out the position computation using the pseudo ranges and the previously extracted navigation data (step ST14).

As described above, the present embodiment 1 makes a decision as to whether the received electric field is good or not, and communicates with the central server 2 only when the received electric field is bad. This makes it possible to sharply reduce the communication cost.

Figure 2:
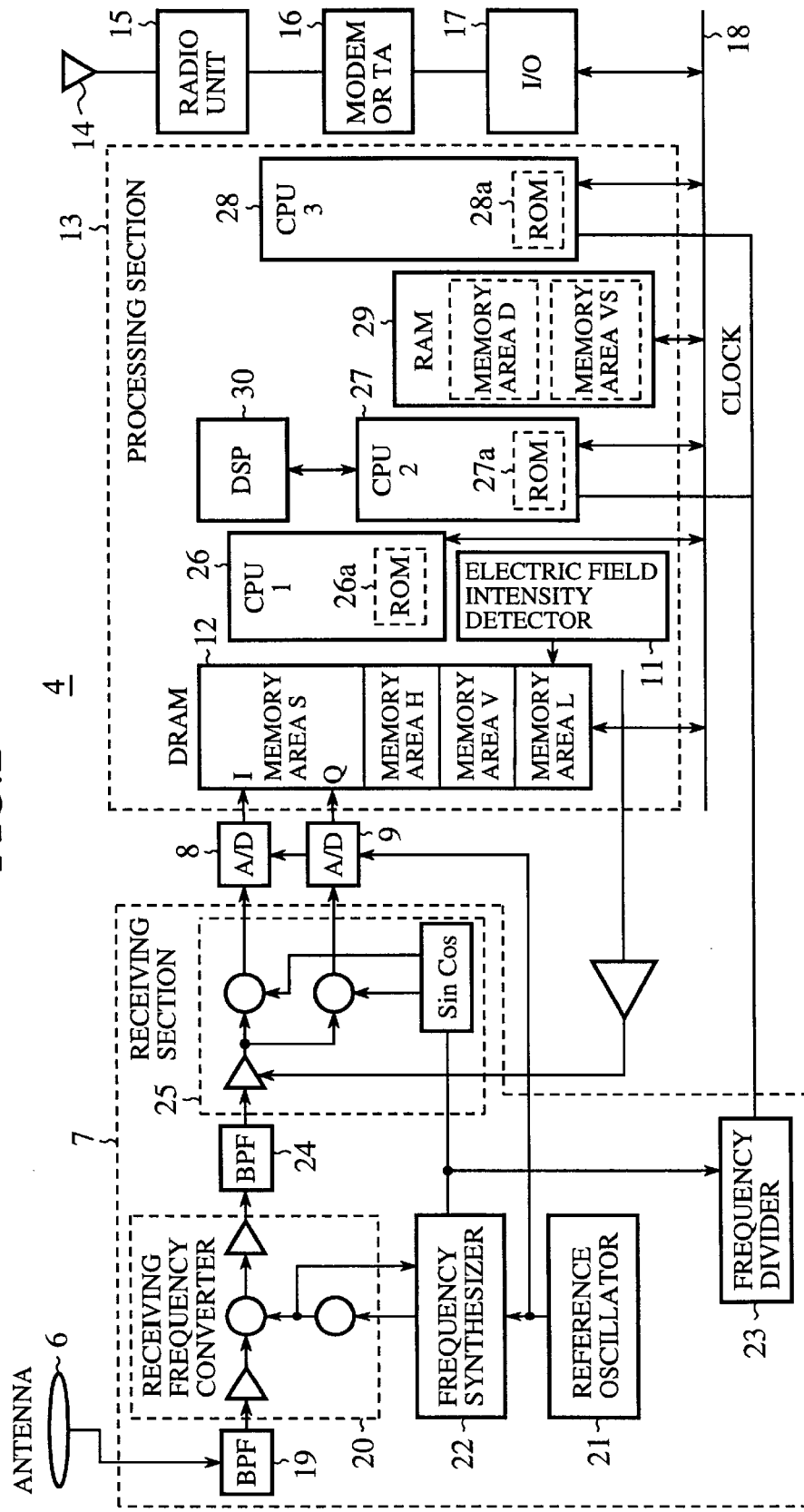
FIG. 2 is a block diagram showing a specific configuration of a terminal as shown in FIG. 1.

FIG. 2 is a block diagram showing a concrete configuration of the terminal 4 as shown in FIG. 1. In FIG. 2, the reference numeral 7 designates a receiving section; 8 and 9 designates an analog-to-digital converter (called "A/D converter" from now on); 11 designates a received electric field intensity detector; 12 designates a memory (DRAM); 13 designates a processing section; 14 designates an antenna mounted on a radio unit 15 for exchanging data with the central server 2 by radio; 16 designates a modem (or terminal adapter) connected to the radio unit 15; and 17 designates an I/O (input/output) circuit interposed between the modem 16 and a bus 18.

The receiving section 7 comprises a down converter 20 with bandpass filters 19 and 24 connected to its input and output terminals; a reference oscillator 21; a frequency synthesizer 22; a frequency divider 23 for dividing the output frequency of the frequency synthesizer 22 to generate a clock signal; and an I/Q converter 25. The processing section 13 comprises CPUs 26, 27 and 28 connected to the bus 18; a memory (RAM) 29 connected to the bus 18; and a DSP 30 connected to the CPU 27. The CPUs 26–28 are connected with memories (ROM) 26a–28a, respectively.

Figure 3:
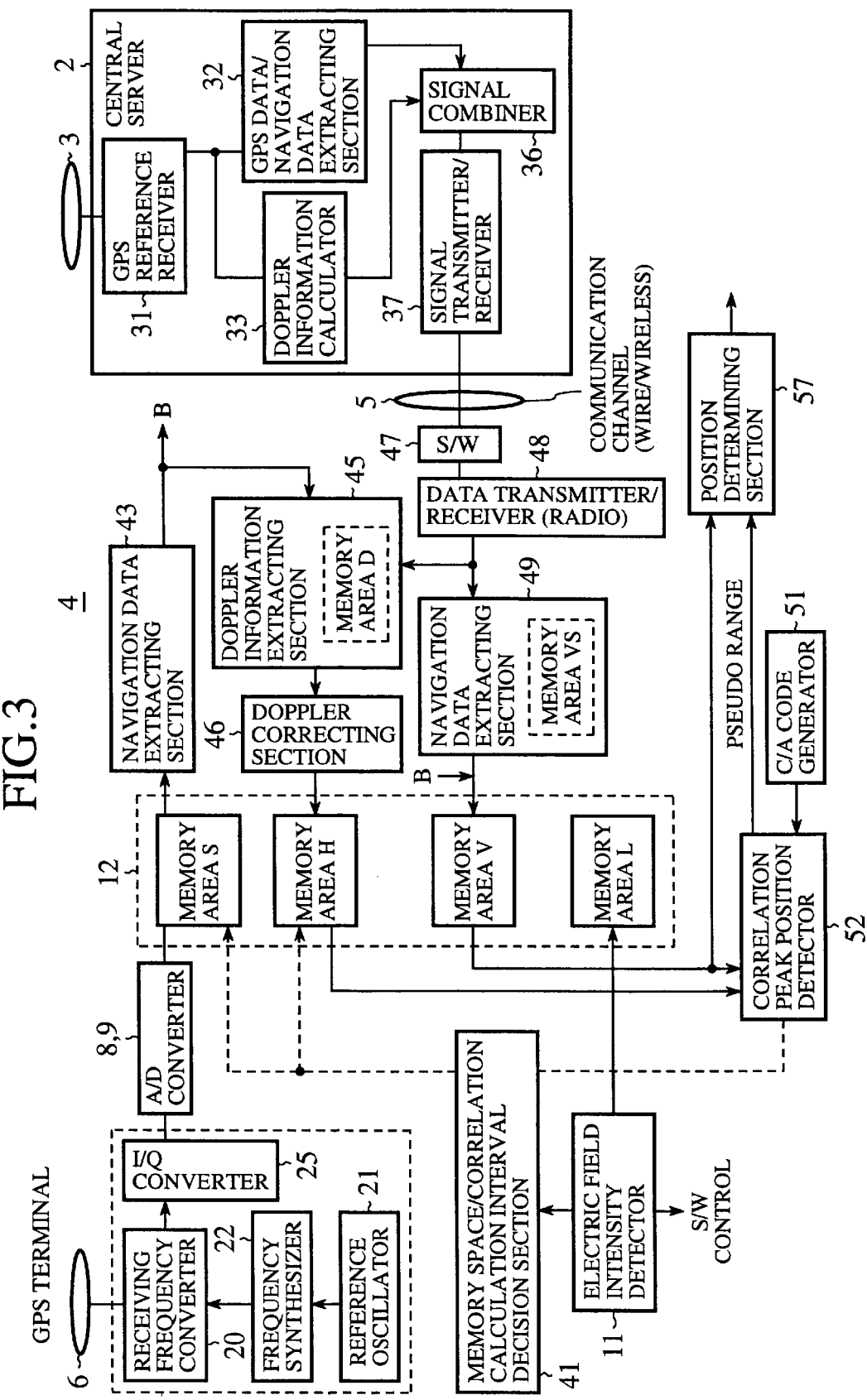
FIG. 3 is a block diagram showing a configuration of the terminal as shown in FIG. 2 in more detail.

FIG. 3 is a block diagram showing the terminal 4 as shown in FIG. 2 in more detail in connection with the central server 2, in which the same reference numerals designate the same or like portions to those of FIG. 2, and the description thereof is omitted here. The central server 2 comprises a GPS reference receiving section 31, a navigation data extracting section 32 for extracting navigation data contained in the GPS data, a Doppler information computing section 33, a signal combiner 36 and a signal transmitter and receiver 37.

The terminal 4 comprises an interval determining section 41 for determining an interval of the memory space and that of the correlation calculation in response to the output of the received electric field intensity detector 11; a navigation data extracting section 43 connected to the memory area S; a data transmitting and receiving section 48 connected to the communication medium 5 via a switch 47; a Doppler information extracting section 45 connected to the output of the navigation data extracting section 43 and to the output of the data transmitting and receiving section 48; a Doppler correction section 46 connected to the memory area H; a navigation data extracting section 49 connected to the output of the data transmitting and receiving section 48; and a position determining section for determining the position from the pseudo ranges and the navigation data fed from the memory area V. The pseudo ranges are obtained by detecting correlation between the output of the memory area V and the output of a C/A code sequence generator 51 by a correlation peak position detector 52.

The sections from the navigation data extracting section 43 to the position determining section 57 are not separately installed, but their functions are carried out by the processing section 13 comprising the CPUs 26–28 and the DSP 30, for example. Besides, although the three CPUs are shown for the sake of simplifying the description, a single CPU can accomplish the same functions in practice.

Next, the operation of the present embodiment 1 will be described.

Figure 4:
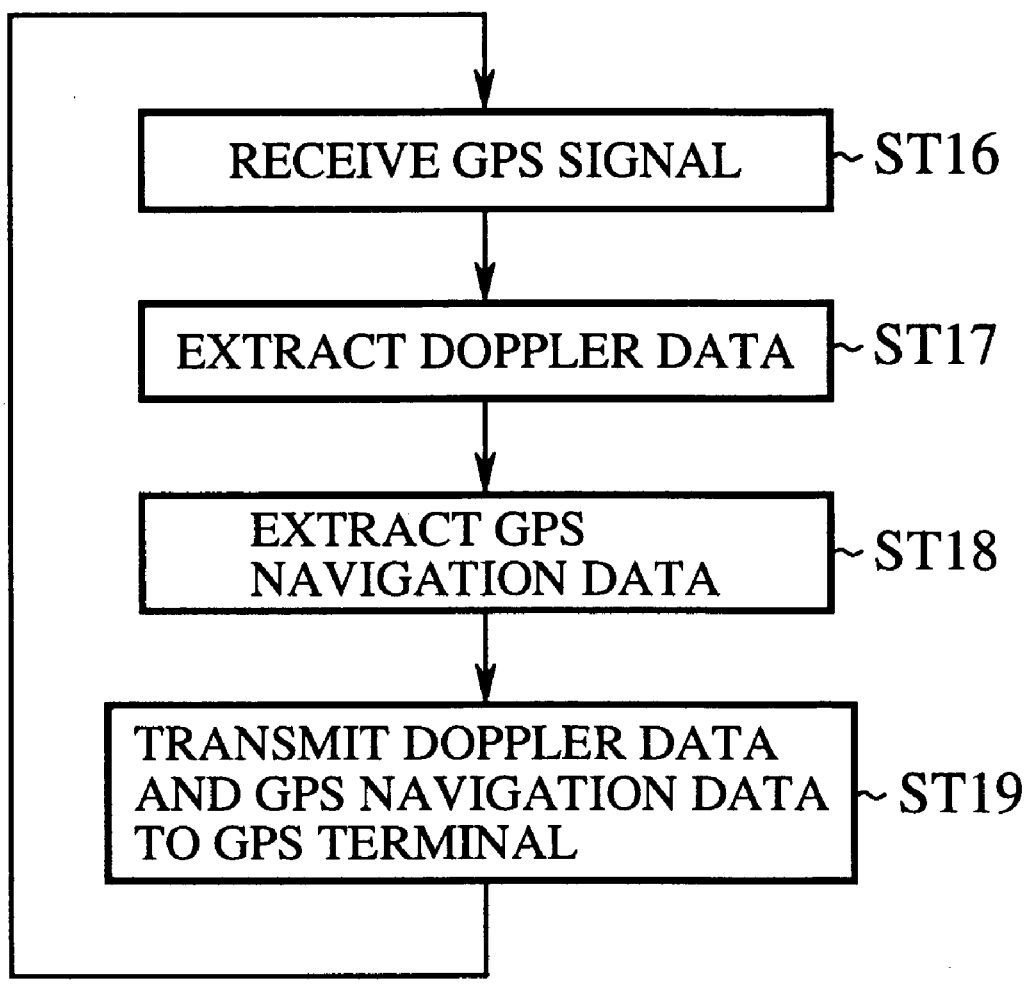
FIG. 4 is a flowchart illustrating the operation of a central server.

FIG. 4 is a flowchart illustrating the operation of the central server 2. In the central server 2, the GPS reference receiving section 31 receives the GPS signal (step ST16), first. Subsequently, the Doppler information computing section 33 calculates the Doppler shift (step ST17); the navigation data extracting section 32 extracts the GPS navigation data (step ST18); and the signal combiner 36 combines them. Then, in response to a request from the terminal 4 for the data, the signal transmitter and receiver 37 transmits the Doppler shift and the navigation data to the terminal 4 (step ST19).

Figure 5:
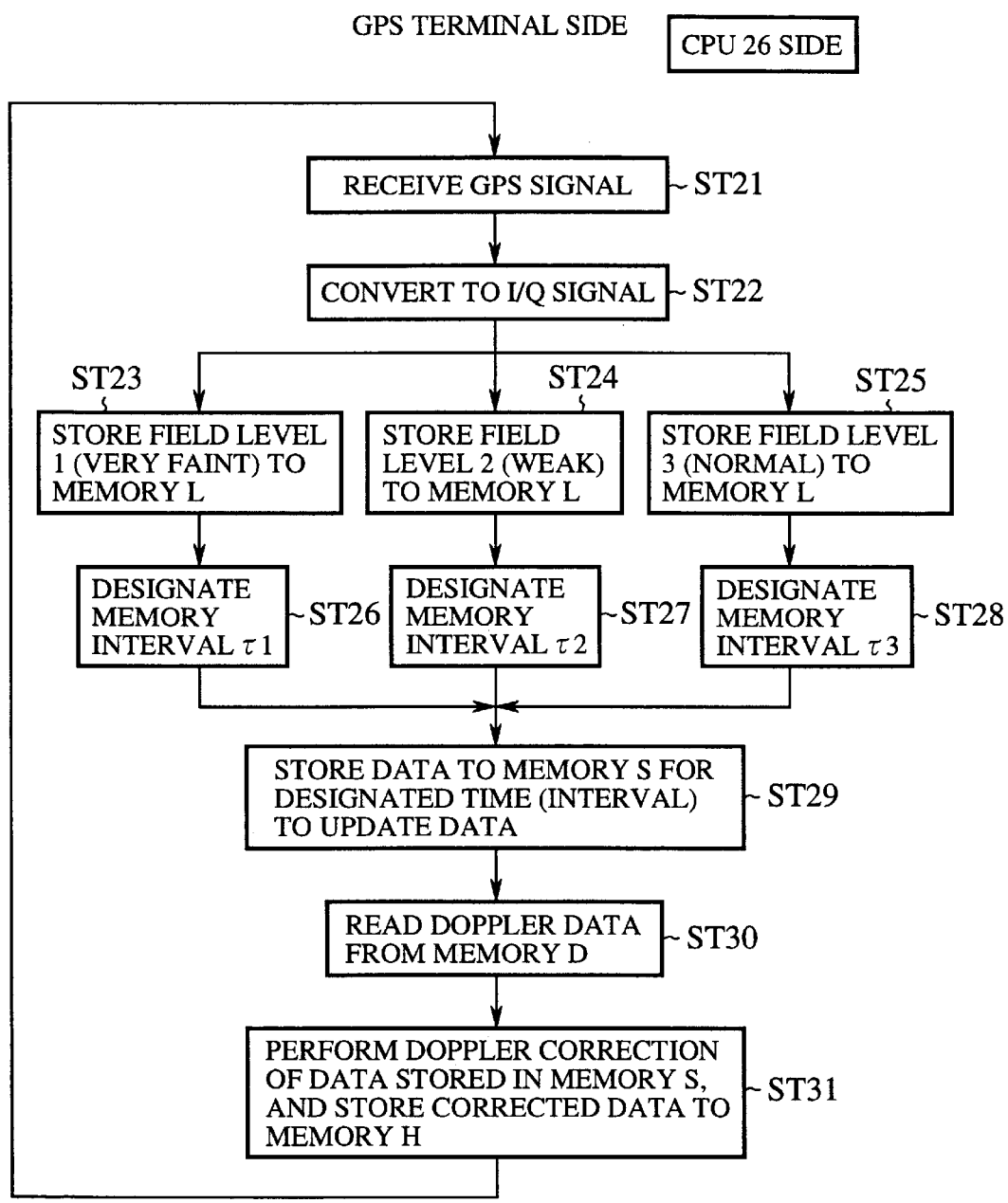
FIG. 5 is a flowchart illustrating the operation of a CPU in the Global Positioning System and Global Positioning method.
Figure 6:
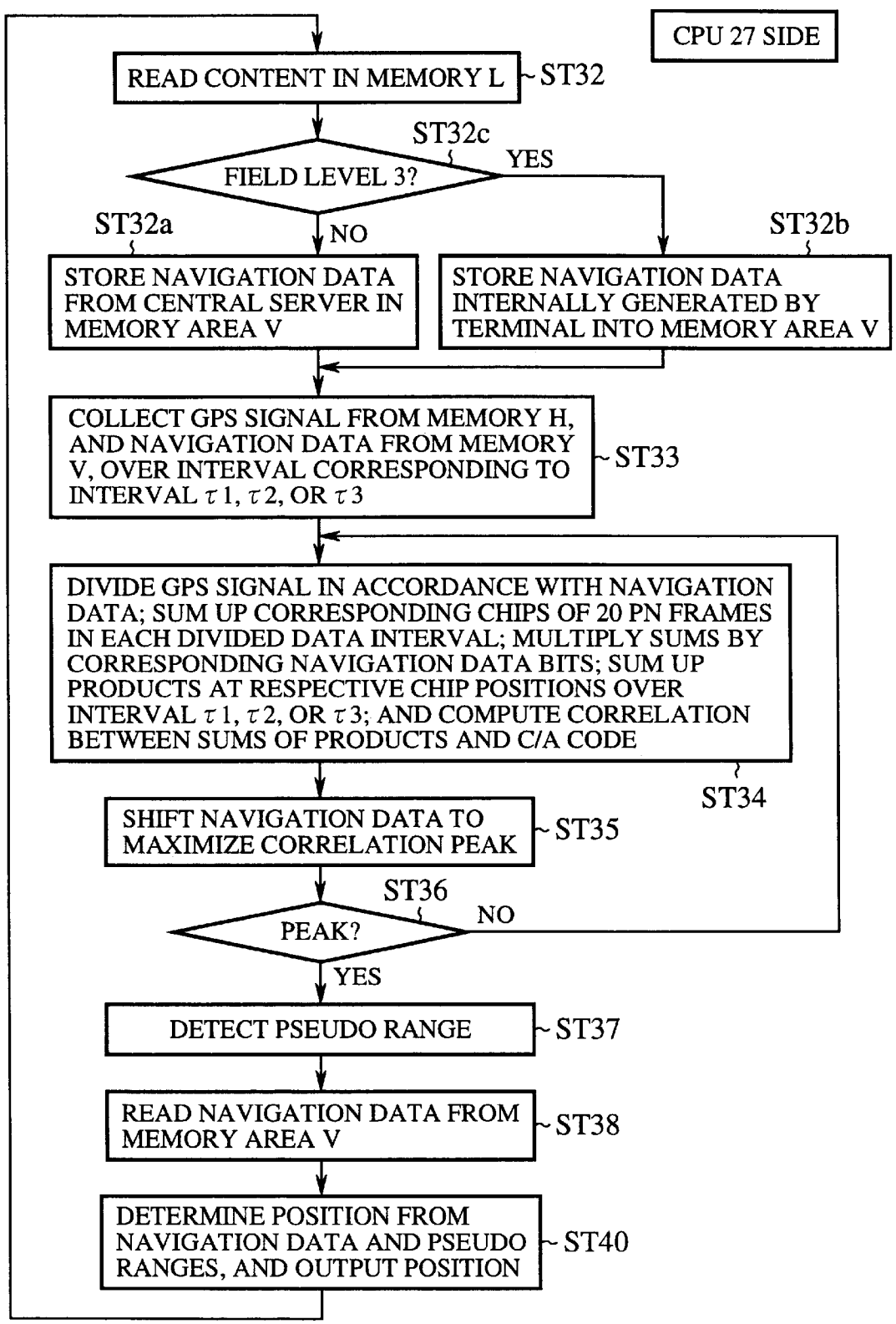
FIG. 6 is a flowchart illustrating the operation of a CPU in the Global Positioning System and Global Positioning method.
Figure 7:
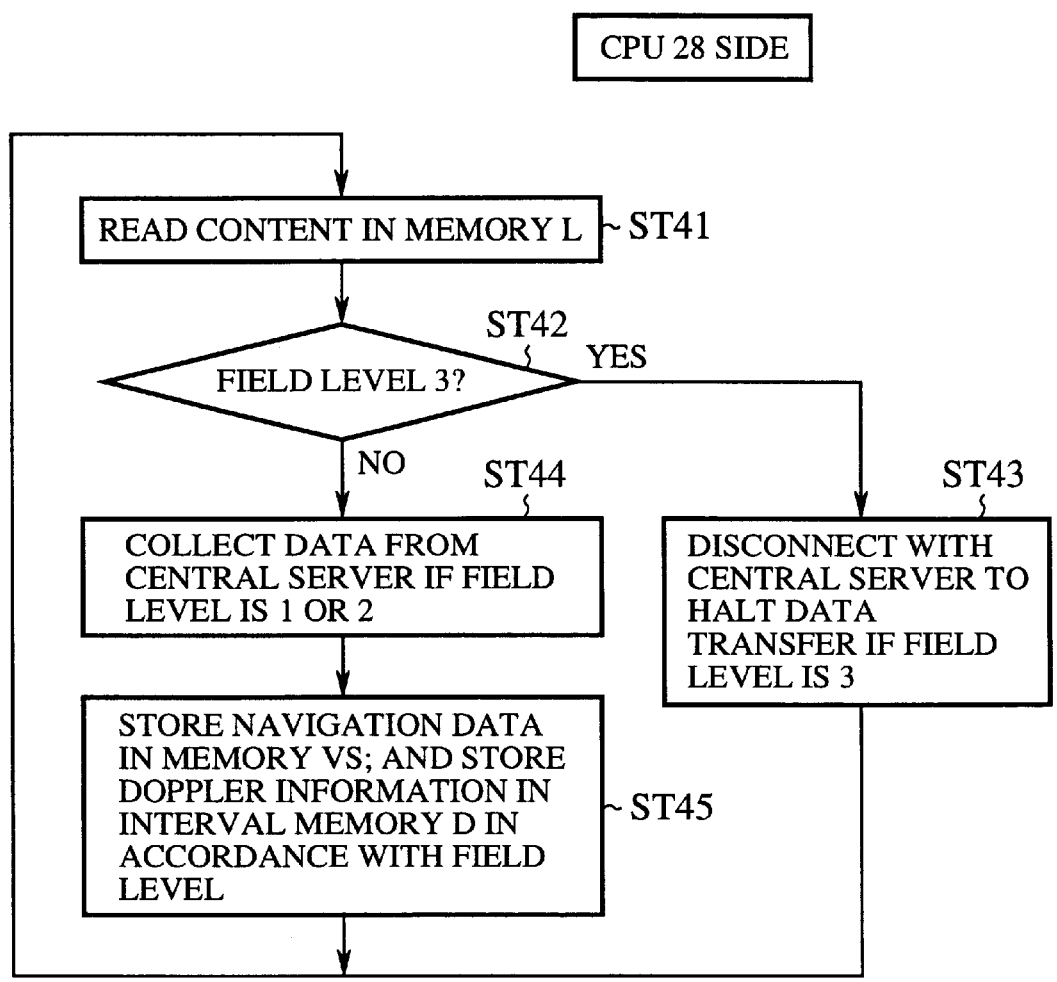
FIG. 7 is a flowchart illustrating the operation of a CPU in the Global Positioning System and Global Positioning method.

FIGS. 5–7 are flowcharts illustrating operations of the CPUs 26–28 in the Global Positioning System. First, on the CPU 26 side in the terminal 4, the antenna 6 receives the GPS signal (step ST21), and supplies the received GPS signal to the received frequency converter 20 which converts it to a predetermined frequency using the local oscillator frequency fed from the reference oscillator 21 via the frequency synthesizer 22. Subsequently, the I/Q converter 25 carries out the I/Q conversion of the output of the received frequency converter 20 (step ST22), thereby extracting an I signal and a Q signal. The A/D converters 8 and 9 carry out the A/D conversion of these signals.

On the other hand, the received electric field intensity detector 11 detects and determines the received electric field intensity: an electric field level 1 (extremely faint); an electric field level 2 (weak); or an electric field level 3 (normal) (steps ST23–ST25). A memory interval and correlation calculation interval determining section 41 determines in response to the electric field level a memory interval $\tau 1$, a memory interval $\tau 2$ or a memory interval $\tau 3$ (steps ST26–ST28), and stores (updates) the GPS signal passing through the A/D converters 8 and 9 into the memory area S in the memory 12 in accordance with the time interval determined above (step ST29).

The navigation data extracting section 43 reads the content of the memory area S to extract the navigation data. The Doppler information extracting section 45 extracts the Doppler information not only from the signal fed from the navigation data extracting section 43, but also from the signal sent from the central server 2 fed via the data transmitting and receiving section 48, and stores the Doppler information to a memory area D. The Doppler correction section 46 reads the data from the memory area D (step ST30), carries out the Doppler correction of the data in the memory area S, and stores the corrected data in the memory area H (step ST31).

Subsequently, on the CPU 27 side, it reads the electric field intensity from the memory area L (step ST32), and when the electric field level is 3 (normal), the CPU 27 reads the navigation data from the memory area V that stores the navigation data fed from the navigation data extracting section 43 (step ST32b). On the other hand, when the electric field level is 1 or 2 (very faint or faint), the CPU 27 reads the navigation data which is sent from the central server 2 and stored in the memory area V via the transmitting and receiving section 48 and the navigation data extracting section 49 (step ST32a). Then, the CPU 27 collects the GPS signal and navigation data from the memory areas H and V, respectively, in the interval corresponding to the determined memory interval $\tau 1$, $\tau 2$ or $\tau 3$ (step ST33). The correlation peak position detector 52 divides the GPS signal read out of the memory area H into a plurality of data blocks in accordance with respective bits of the navigation data read out of the memory area V; sums up the corresponding chips in the 20 PN frames constituting each data block (corresponding to each bit of the navigation data); multiplies the resultant sums by the corresponding bits of the navigation data to form a plurality of products; sums up the products over the memory interval $\tau 1$, $\tau 2$ or $\tau 3$; and computes the correlation between the summed up result (C/A code sequence) and the C/A code sequence generated by the C/A code sequence generator 51 (step ST34). This process will be described in more detail later.

Afterward, the correlation peak position detector 52 shifts the navigation data along the time axis such that the correlation peak value becomes maximum, and iterates the same correlation calculations to determine the correlation peak position as the boundary of the polarity inversion of the navigation data, and as the pseudo ranges (ST36 and ST37).

Then, the correlation peak position detector 52 carries out the position computation from the navigation data and the pseudo ranges, and outputs the location (steps ST38 and ST40).

The CPU 28 reads the content in the memory area L (step ST41), and decides as to whether the electric field level is equal to or greater than 3 (normal) (step ST42). If the decision result is positive (YES), the CPU 28 turns off the switch 47 to disconnect the central server 2, thereby halting data transferring (step ST43). In contrast, if the decision result is negative (NO), that is, if the received electric field level is 1 or 2 (very weak or weak), it turns on the switch 47 to collect the data from the central server 2 (step ST44), and stores through the Doppler information extracting section 45 the navigation data to the memory area VS and the Doppler information to the memory area D for an interval corresponding to the received electric field level (step ST45).

As described above, the present embodiment 1 is configured such that it decides the level of the received electric field, and makes a communication with the central server 2 only when the received electric field is insufficient. This makes it possible to sharply reduce the communication cost.

Furthermore, the present embodiment 1 is configured such that the correlation peak position detector 52 sums up the values at the same chip positions in the individual periods of the regularly arranged C/A code sequence consisting of multiple chips, and sums up the C/A code sequence using the changing boundary from an increase to decrease or vice versa in the summed up result as the start point of the data summation. This makes it possible to solve the problem in the conventional system in that only insufficient improvement in the sensitivity (S/N ratio) is achieved because the signal components are canceled out in the integral (accumulating). Thus, a high sensitivity Global Positioning System can be implemented by positively detecting the C/A code sequence buried in noise, and the pseudo ranges.

An example of the correlation peak position detector 52 will now be described in more detail.

This example carries out the following steps: it successively divides the regularly arranged C/A code sequence consisting of a lot of chips into data blocks with a length of one bit of the navigation data beginning from any desired position; takes a cumulative sum of the corresponding chips in individual PN frames in each data block of the C/A code sequence; sums up the resultant cumulative sums with matching their polarities in accordance with the navigation data detected in the GPS terminal or with the navigation data sent from the central server; carries out the correlation calculation between the summed up result and the C/A code sequence; and adopts the correlation peak position as the start position of the data summation.

Figure 8:
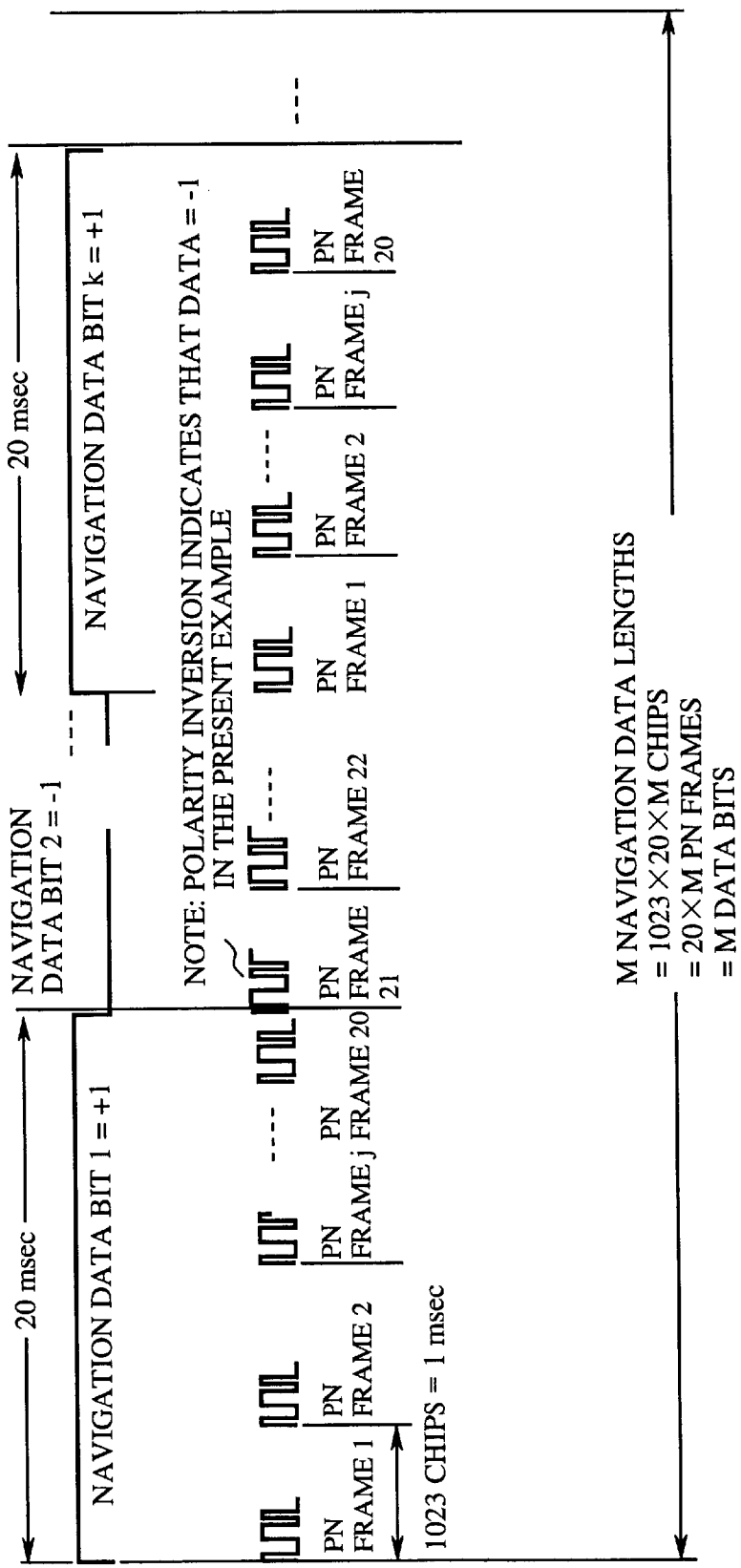
FIG. 8 is a diagram showing a structure of a GPS signal (C/A code sequence)

FIG. 8 illustrates the relationship between the number of PN frames and the number of chips for M navigation data lengths.

As shown in this figure, each bit of the navigation data consists of 20 PN frames, and one PN frame consists of 1023 chips. Thus, one PN frame (C/A code sequence=PN code sequence) of the GPS signal passing through the Doppler correction and stored in the memory consists of 1023 chips.

Although each PN frame of the GPS signal consists of 1023 chips, the A/D converters must convert it at a sampling rate twice that or greater for accurate transmission of the information according to the sampling theorem. Thus, the number of the signal sampling of the memory S and memory V is twice that or greater.

Accordingly, the 1023 chips are stored in the number of samples of $1023 \times 2i$ (i=1, 2, 3, . . . ), for example.

For the sake of simplicity, the following description is made in terms of the chips of the C/A code sequence.

In FIG. 5, the CPU 26 carries out the Doppler correction for each satellite on the basis of the Doppler information (Doppler frequency shift for each satellite) read from the memory D (step ST30 and ST31), and stores the corrected values to the memory H. As for the signal undergone the Doppler correction by the CPU 27 of FIG. 5, the regularly arranged C/A code sequence consisting of multiple chips is divided into multiple data blocks beginning from an arbitrary position, each data block having a length of one bit of the navigation data. Subsequently, sampled data of corresponding 1023 chips (=$1023 \times 2i$ sampled data, where i=1, 2 or 3, for example) in the 20 PN frames in each data block are subjected to the first summation over the interval of one bit of the navigation data beginning from the initial divided position, thereby resulting in $1023 \times 2i$ sums for each data block.

The GPS data stored is data consisting of the regular sequence of the PN frames, and the phase of the C/A code sequence (PN code sequence) may be reversed in accordance of the polarity of each 20 millisecond long bit of the navigation data. A phase inversion position of the C/A code sequence agrees with that of the navigation data.

Figure 9:
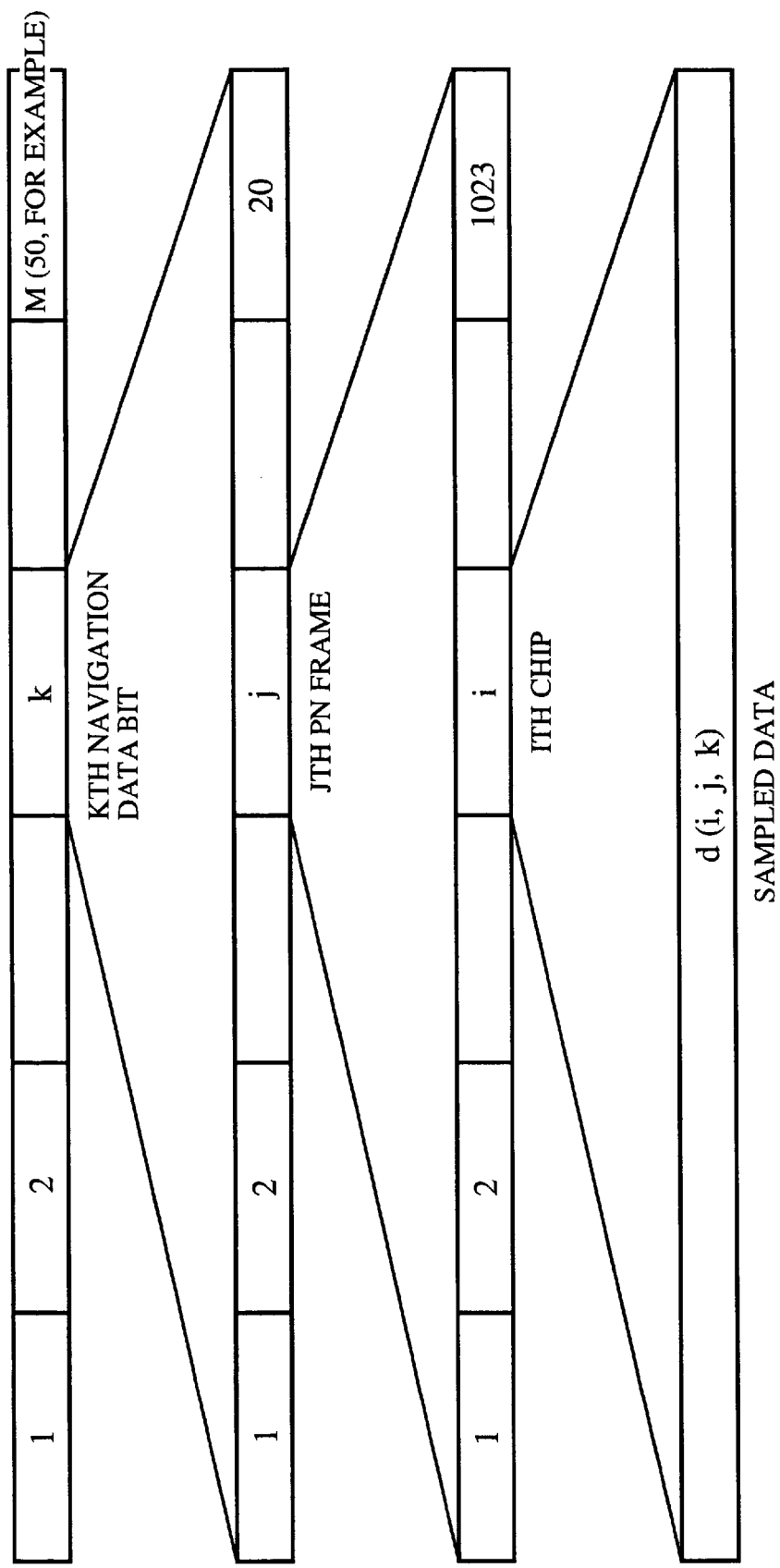
FIG. 9 is a diagram showing a data structure of the GPS signal (C/A code sequence)

FIG. 9 shows the relationships between the navigation data, PN frames and chips for M bits of the navigation data. In this figure, d(i,j,k) designates the sampled data of an with chip in a jth PN frame in a kth navigation data bit. The data d(i,j,k) are stored in the memory over the prescribed time interval (M bits of the navigation data in the present embodiment). It is unknown where the data starts in the GPS signal.

Figure 10:
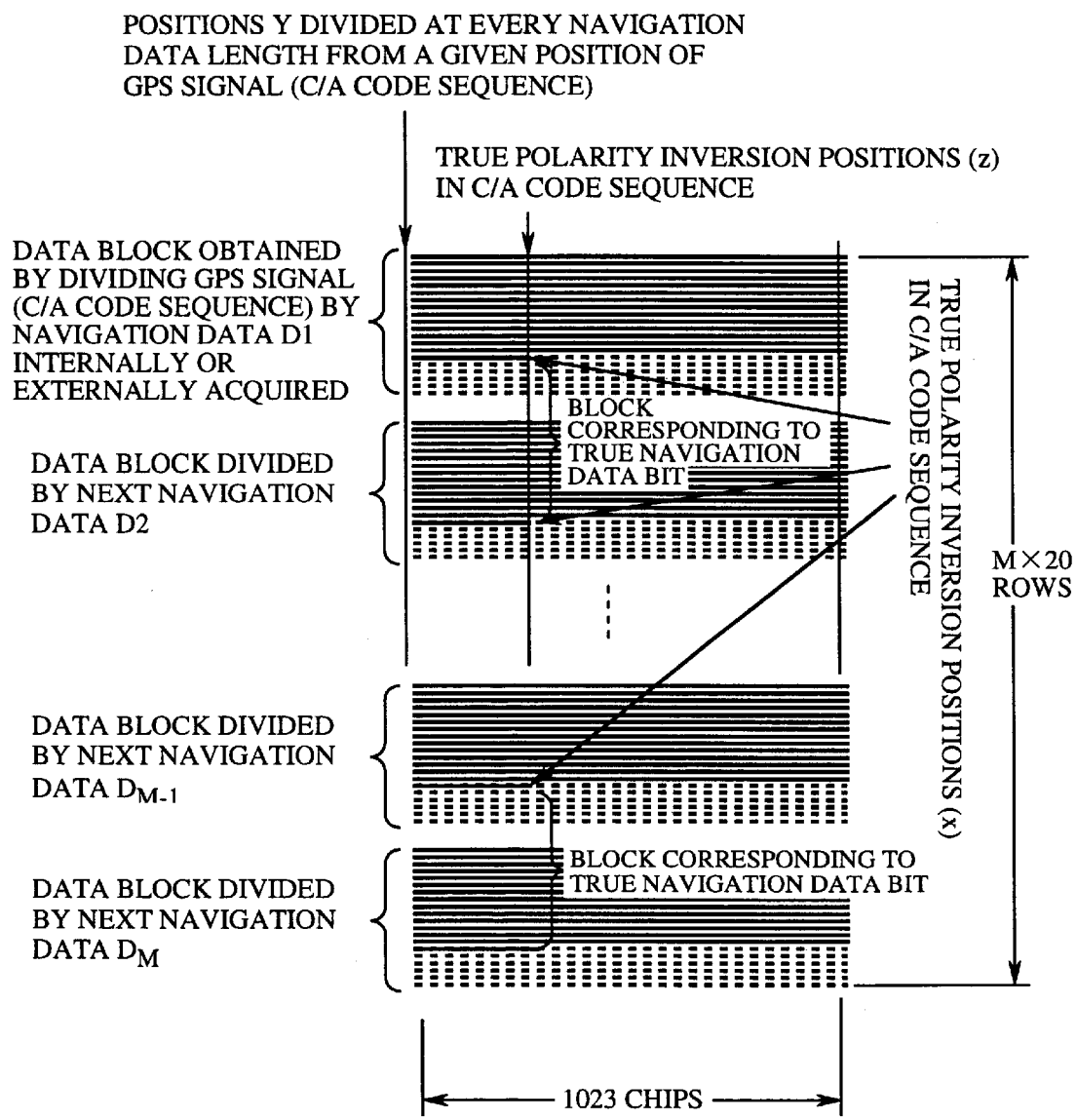
FIG. 10 is a diagram illustrating a method of detecting polarity inversions in navigation data.

FIG. 10 illustrates the data stored in the memory. The GPS signal (C/A code sequence) is divided at every internal or external navigation data bit length interval, and the data corresponding to M bits of the navigation data are stored in the memory. Thus, the total of 1023×20×M chips of the C/A code sequence corresponding to the M bits of the navigation data are stored in the memory.

The data stored in the memory are shown in a matrix with 20×M rows and 1023 columns, in which 20×M corresponds to the number of PN frames for M navigation data bits, and 1023 corresponds to the number of chips per PN frame. Thus, the data next to the 1023th column of the first row is the first column data of the second row. Likewise, the data next to the 1023th column of the second row is the first column data of the third row. Iterating such arrangement up to the 20×Mth row and 1023 th column.

When dividing the GPS signal (navigation data) at every external or internal navigation data bit length interval, the initial positions of the divisions usually disagree with the initial positions at which the phase inversion of the GPS signal takes place, that is, the true initial positions of the navigation data bit in the GPS signal.

The correlation peak position detector 52 matches them as much as possible by the following process.

Figure 11:
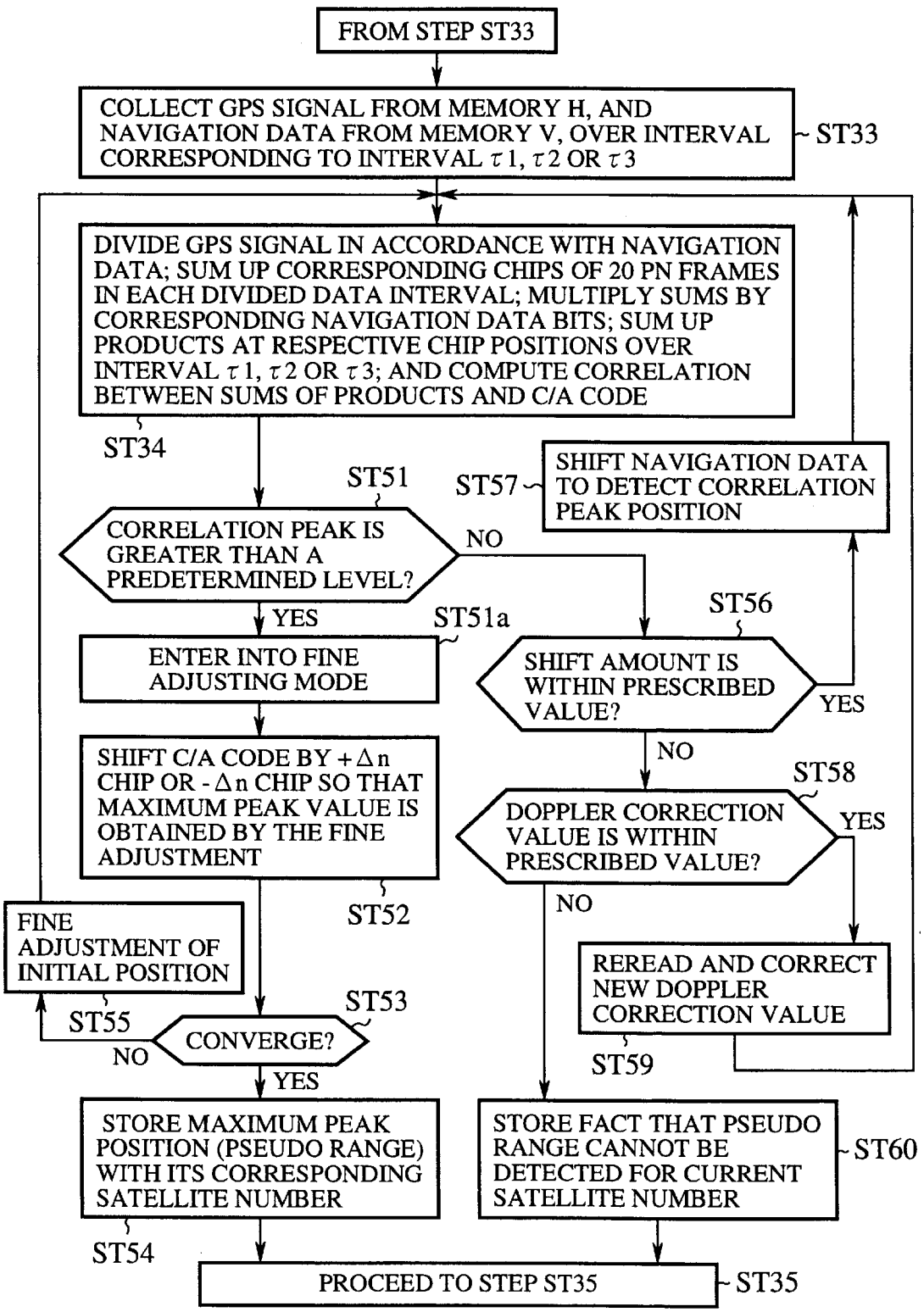
FIG. 11 is a flowchart illustrating a method of detecting polarity inversions in navigation data.

This method will be described in detail with reference to FIG. 11.

First, in FIG. 10, the data elements in the 20×1023 matrix obtained by dividing the GPS signal in accordance with the navigation data bit D1 are defined by d(i,j,k). Then, the following sums are calculated.

$$S_1(D_1)=d(1,1,1)+d(2,1,1)+d(3,1,1)+\ldots+d(20,1,1)$$

$$S_2(D_1)=d(1,2,1)+d(2,2,1)+d(3,2,1)+\ldots+d(20,2,1)$$

$$S_3(D_1)=d(1,3,1)+d(2,3,1)+d(3,3,1)+\ldots+d(20,3,1)$$

$$S_i(D_1)=d(1,i,1)+d(2,i,1)+d(3,i,1)+\ldots+d(20,i,1)$$

$$S_{1023}(D_1)=d(1,1023,1)+d(2,1023,1)+\ldots+d(20,1023,1)$$

Subsequently, the sums $S_1(D_1)$, $S_2(D_1)$, ... $S_i(D_1)$, ... $S_{1023}(D_1)$ are each multiplied by the navigation data bit $D_1$ (=−1 or +1), thereby obtaining the following products.

$$D_1 \times S_1(D_1), D_1 \times S_2(D_1), \ldots, D_1 \times S_i(D_1), \ldots, D_1 \times S_{1023}(D_1).$$

Likewise, as for the data divided in accordance with the navigation data bit D2, the following sums are calculated.

$$S_1(D_2)=d(1,1,2)+d(2,1,2)+d(3,1,2)+\ldots+d(20,1,2)$$

$$S_2(D_2)=d(1,2,2)+d(2,2,2)+d(3,2,2)+\ldots+d(20,2,2)$$

$$S_3(D_2)=d(1,3,2)+d(2,3,2)+d(3,3,2)+\ldots+d(20,3,2)$$

$$S_i(D_2)=d(1,i,2)+d(2,i,2)+d(3,i,2)+\ldots+d(20,i,2)$$

$$S_{1023}(D_2)=d(1,1023,2)+d(2,1023,2)+\ldots+d(20,1023,2)$$

Subsequently, the sums $S_1(D_2)$, $S_2(D_2)$, ... $S_i(D_2)$, ... $S_{1023}(D_2)$ are each multiplied by the navigation data bit $D_2$ (=−1 or +1), thereby obtaining the following products.

$$D_2 \times S_1(D_2), D_2 \times S_2(D_2), \ldots, D_2 \times S_i(D_2), \ldots, D_2 \times S_{1023}(D_2).$$

In just the same manner, as for the data divided in accordance with the navigation data bit $D_M$, the following sums are calculated.

$$S_1(D_M)=d(1,1,M)+d(2,1,M)+d(3,1,M)+\ldots+d(20,1,M)$$

$$S_2(D_M)=d(1,2,M)+d(2,2,M)+d(3,2,M)+\ldots+d(20,2,M)$$

$$S_3(D_M)=d(1,3,M)+d(2,3,M)+d(3,3,M)+\ldots+d(20,3,M)$$

$$S_i(D_M)=d(1,i,M)+d(2,i,M)+d(3,i,M)+\ldots+d(20,i,M)$$

$$S_{1023}(D_M)=d(1,1023,M)+d(2,1023,M)+\ldots+d(20,1023,M)$$

Subsequently, the sums $S_1(D_M)$, $S_2(D_M)$, ... $S_i(D_M)$, ... $S_{1023}(D_M)$ are each multiplied by the navigation data bit $D_M$ (=−1 or +1), thereby obtaining the following products.

$$D_M \times S_1(D_M), D_M \times S_2(D_M), \ldots, D_M \times S_i(D_M), \ldots, D_M \times S_{1023}(D_M)$$

After that, the following data are calculated.

$$C_1=D_1 \times S_1(D_1)+D_2 \times S_1(D_2)+\ldots+D_M \times S_1(D_M)$$

$$C_2=D_1 \times S_2(D_1)+D_2 \times S_2(D_2)+\ldots+D_M \times S_2(D_M)$$

$$C_3=D_1 \times S_3(D_1)+D_2 \times S_3(D_2)+\ldots+D_M \times S_3(D_M)$$

$$C_4=D_1 \times S_4(D_1)+D_2 \times S_4(D_2)+\ldots+D_M \times S_4(D_M)$$

$$C_{1023}=D_1 \times S_{1023}(D_1)+D_2 \times S_{1023}(D_2)+\ldots+D_M \times S_{1023}(D_M)$$

Then, the correlation is calculated between the data sequence consisting of the elements $C_1$, $C_2$, $C_3$, $C_4$, ..., $C_{1023}$ and the 1023 data elements in the C/A code sequence generated inside the GPS terminal 4 (step ST34).

Figure 12:
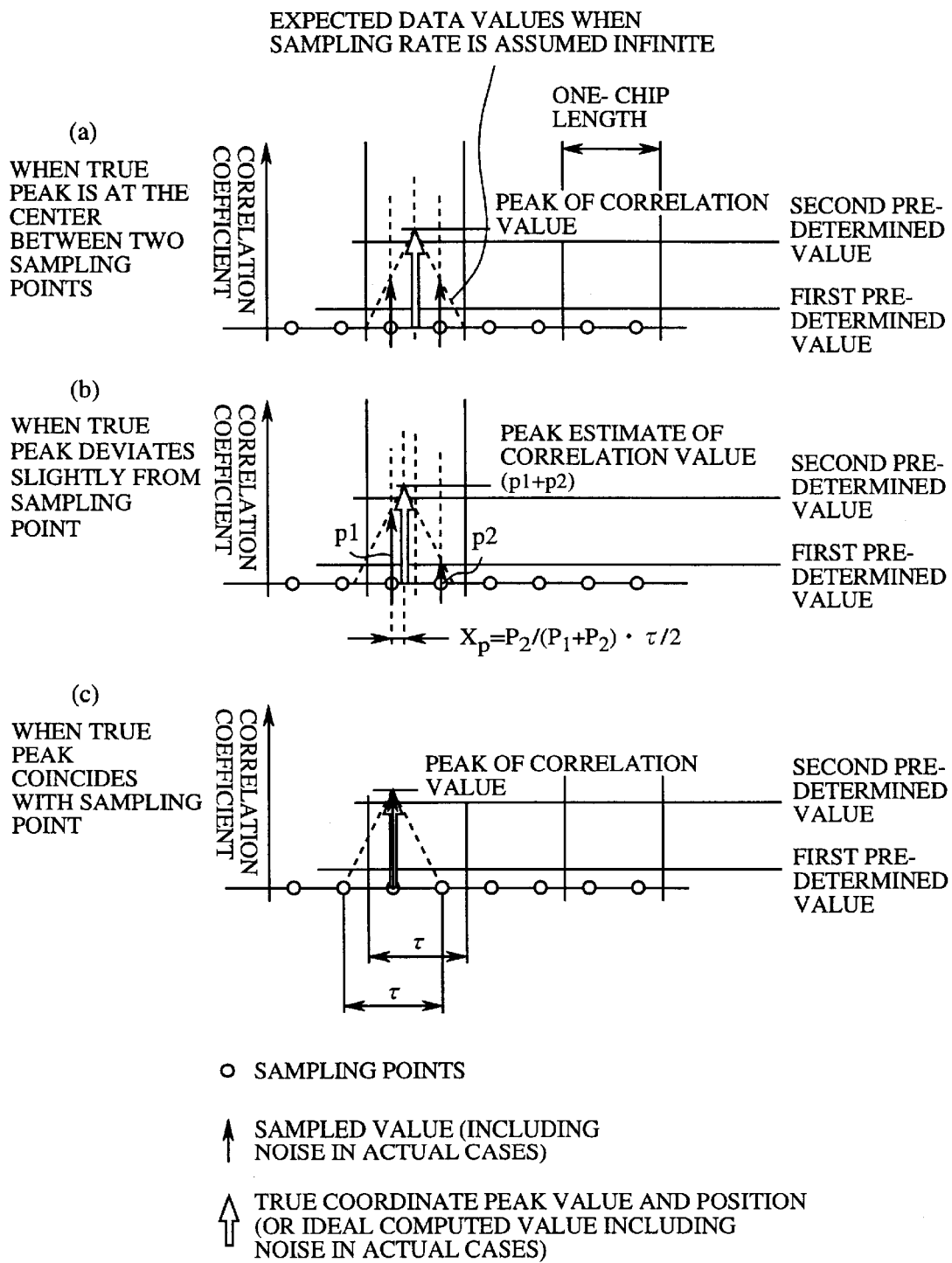
FIGS. 12A–12C are diagrams illustrating processing of a correlation result (correlation peak data) between a secondary sum result and a C/A code sequence.
Figure 13:
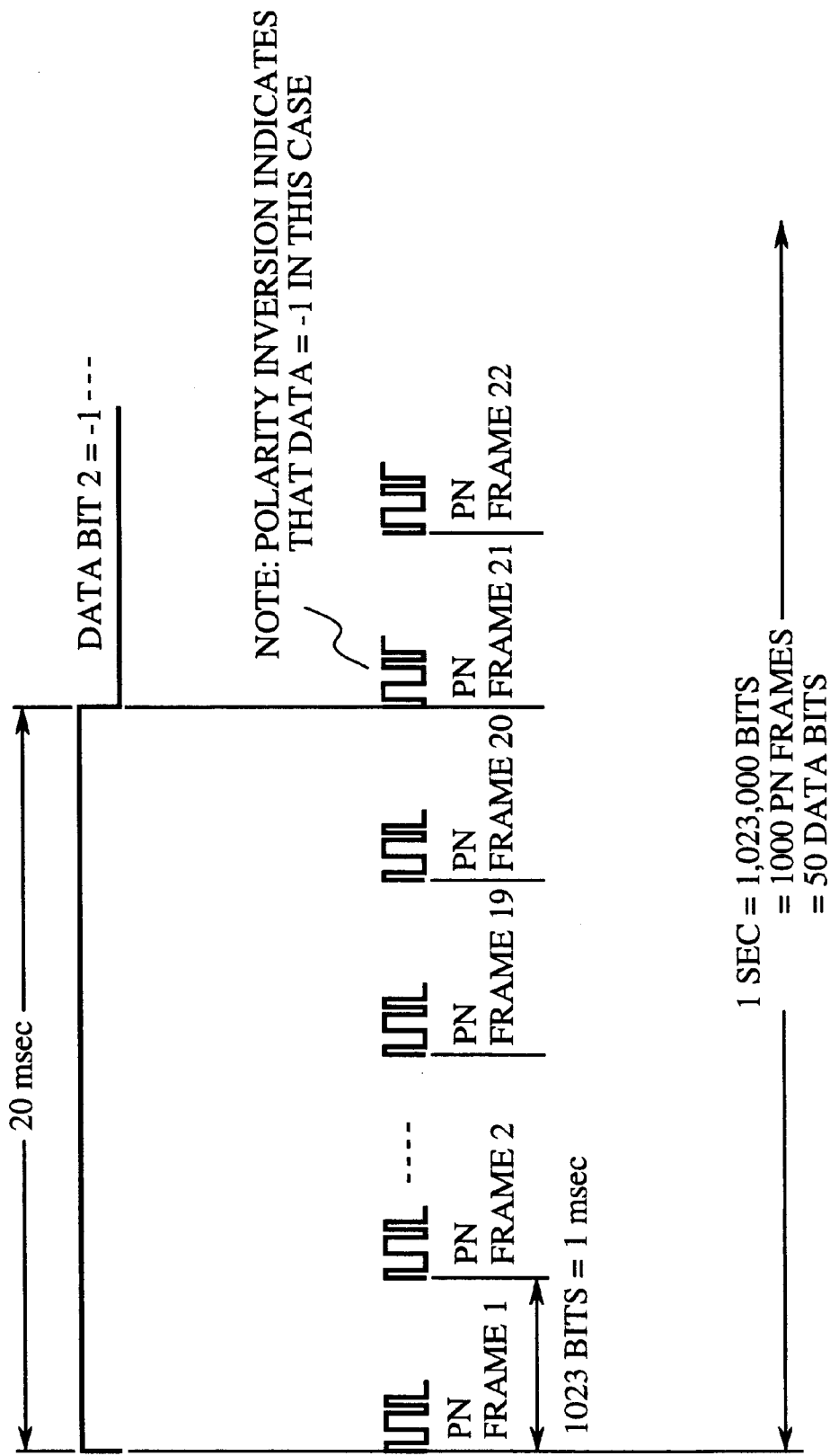
FIG. 13 is a diagram illustrating a C/A code sequence.
Figure 14:
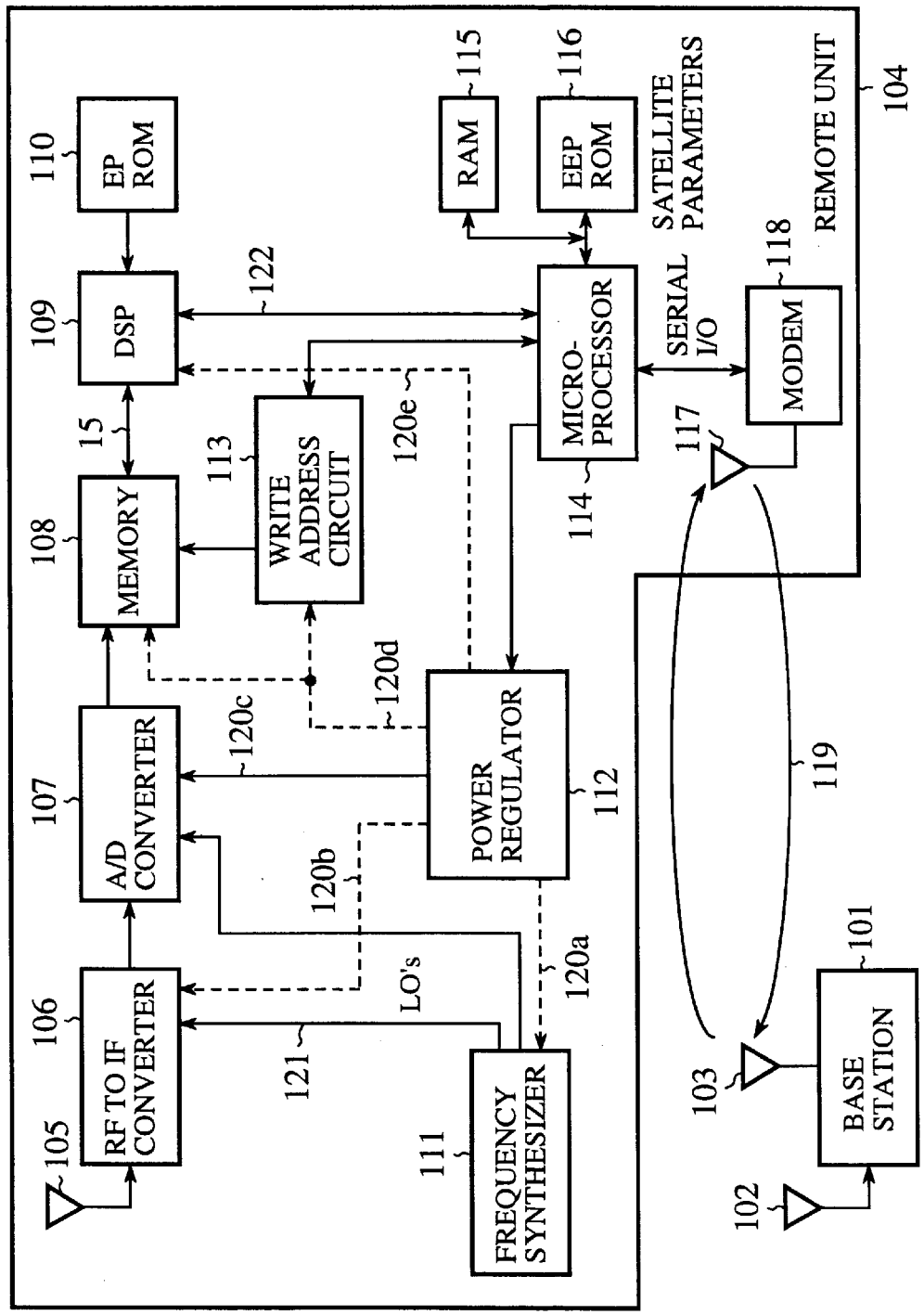
FIG. 14 is a block diagram showing a configuration of a conventional Global Positioning System.
Figure 15:
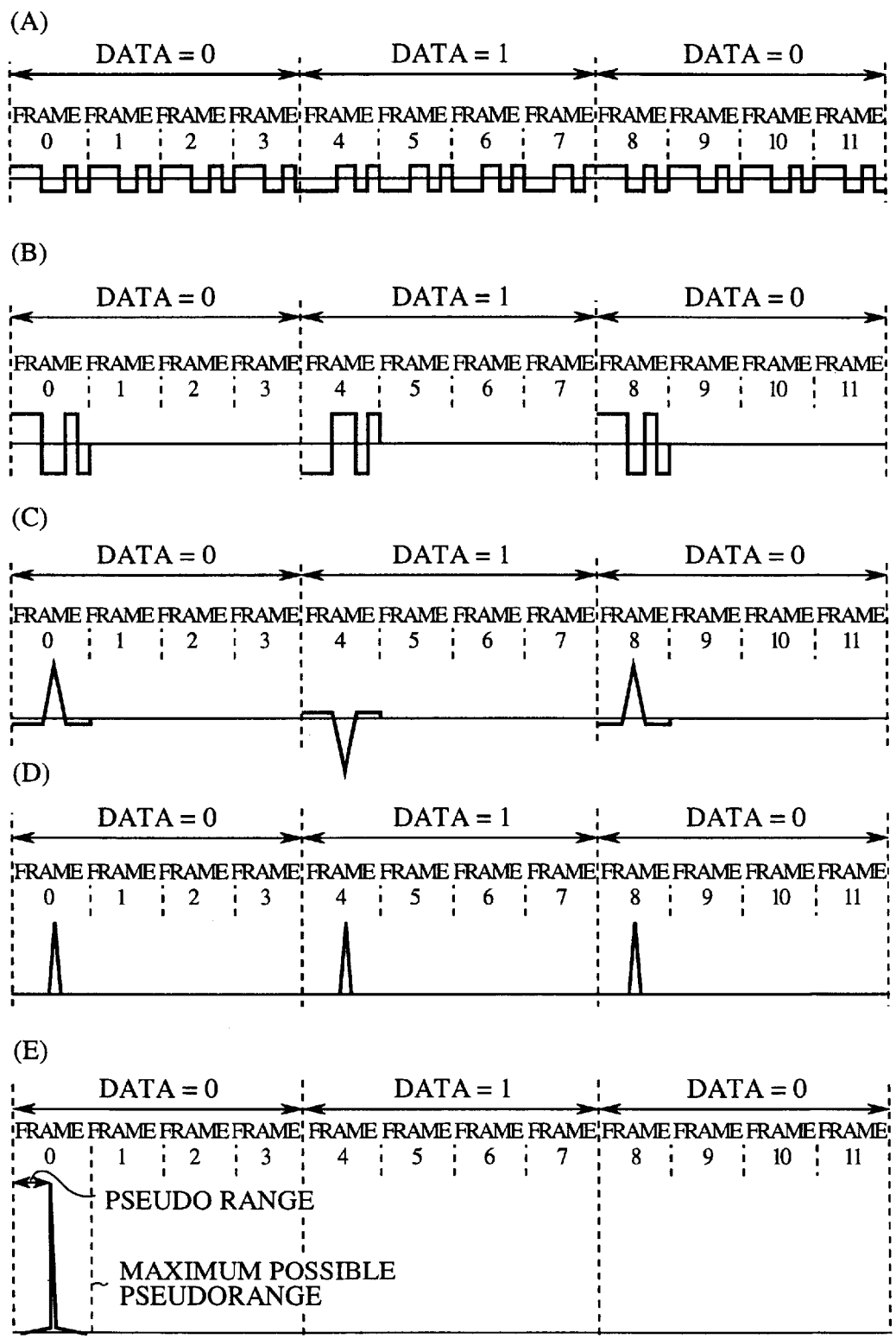
FIG. 15 is a diagram illustrating a method of detecting a C/A code sequence in the conventional Global Positioning System.

The accuracy of the correlation calculation values will increase with the number of the sampling points. FIG. 12 shows an example of providing two sampling points per chip to improve the accuracy of the correlation peak position: FIG. 12(*a*) illustrates a case where a true peak comes at the center of the two sampling points; 12(*b*) illustrates a case where the true peak slightly deviates from a sampling point; and 12(*c*) illustrates a case where the true peak agrees with one of the sampling points. Here, the peak position Xp (local position) is obtained by $Xp=P_2/(P_1+P_2)\cdot\tau/2$, where $\tau$ is a bit length.

Subsequently, the CPU 27 makes a decision as to whether the correlation peak value is equal to or greater than a predetermined value (step ST51). If the decision result at step ST51 is positive (YES), the CPU 27 enters into a fine adjusting mode (step ST51a).

Specifically, it searches for a convergent point at which the peak value becomes greatest with shifting the navigation data (that is, the division positions of the data blocks) by +Δn chip or −Δn chip (step ST52).

If the CPU 27 finds the convergent point at step ST53, it obtains the correlation peak position Xp, and stores the maximum peak position (pseudo range) with the corresponding satellite number (step ST54).

If the decision result at step ST53 is negative (NO), the CPU 27 iterates the fine adjustment of the navigation data with slightly shifting it by +Δn chip or −Δn chip until it converges at step ST53, and if it converges within the predetermined value, the CPU obtains the correlation peak position Xp, and stores the maximum peak value (pseudo range) with the corresponding satellite number (step ST54).

In contrast, if the decision result at step ST51 is negative (NO), the CPU 27 sequentially shift each navigation data such that it can detect the correlation peak position, and iterates steps ST34 and ST57 with shifting the navigation data until the correlation peak exceeds the predetermined level at step ST51. If the shift amount exceeds a prescribed value at step ST56 during the iteration loop, the CPU 27 decides at step ST58 whether the Doppler correction value is normal or not. If the Doppler correction value is within a prescribed value, the CPU rereads and corrects the Doppler correction value again at step ST59, and iterates the steps ST34–ST54. In the course of this, if the Doppler correction value exceeds the prescribed value at step ST58, the CPU 27 makes a decision that it cannot detect the pseudo range with the present satellite, stores the result with the satellite number (step ST60), and proceeds to obtaining pseudo ranges for other satellites.

The foregoing steps ST34, ST51–ST59 are processings for distinguishing the correlation peak position.

As described above, the present embodiment 1 divides into the data blocks the regularly arranged C/A code sequence including a series of PN frames consisting of multiple chips at every navigation data bit interval beginning at any desired position; cumulatively sums up the chips at the same positions in the PN frames in the data block; further sums up the cumulative sums with matching their polarities in accordance with the internally detected navigation data or externally supplied navigation data from the central server; carries out the correlation calculation between the resultant sum and the reference C/A code sequence; and makes the correlation peak position as the start position of the data summation. This enables the C/A code sequence to be cumulatively summed up efficiently without the adverse effect due to the polarity inversions in the navigation data, and makes it possible to positively receive the C/A code sequence in such a bad environment as in a tunnel or building in which the receiving sensitivity is poor.

For example, applying the above described Global Positioning System to a mobile phone so that the position detected by Global Positioning System is marked on a map displayed on the basis of the data read from a memory will provide a mobile phone with a highly accurate navigation function that is effective in a poor receiving sensitivity environment such as in a tunnel or building.

Incidentally, in the foregoing embodiment, the correlation calculation can be achieved using FFT or IFFT.

The correlation calculation can be replaced by the number of the agreements between the internally generated C/A code sequence and the received C/A code sequences, or by the degree of the agreement.

What is claimed is:

1. A Global Positioning System (GPS) including an external system that receives a GPS signal from a satellite and extracts navigation data and Doppler information from the GPS signal, and a GPS terminal connected to the external system through a communication medium and receiving the GPS signal from the satellite, wherein each bit of the navigation data includes a plurality of PN frames, each frame including many chips arranged in a pattern, said GPS terminal comprising:

a frequency converter for converting frequency of the GPS signal received by the GPS terminal;

an analog-to-digital (A/D) converter for converting the GPS signal passing through the frequency converter into corresponding GPS data;

a memory for storing the GPS data as stored GPS data for a time interval;

a Doppler correction section for Doppler correction of the stored GPS data to produce Doppler corrected data, using Doppler information from one of the GPS terminal and the external system;

means for sequentially dividing the Doppler corrected data into a plurality of data blocks with a length of a navigation data bit in accordance with navigation data supplied from one of the GPS terminal and the external system;

means for calculating, for each of the data blocks, a cumulative sum of chips for corresponding positions in individual PN frames in the data block;

means for multiplying each cumulative sum by a corresponding navigation data bit and for outputting a plurality of products of the cumulative sums and the navigation data bits;

means for summing the plurality of products for respective chip positions; and means for computing correlation between a set of sums of the products and a PN code sequence generated in the GPS terminal, and for calculating a pseudo range between the GPS terminal and the satellite from a correlation peak at a maximum correlation.

2. The Global Positioning System according to claim 1, further comprising means for shifting divisions of the data blocks if the correlation peak is less than a threshold level, and for supplying new data blocks to said means for calculating a cumulative sum.

3. The Global Positioning System according to claim 2, wherein said means for shifting divisions of the data blocks shifts the divisions to maximize the correlation, and said means for computing correlation determines the pseudo range from the correlation peak.

4. The Global Positioning System according to claim 1, further comprising a received electric field detector for detecting intensity of a received electric field, wherein said means for sequentially dividing the GPS data divides, when the received electric field is greater than a threshold level, the GPS data passing through the Doppler correction section into the data blocks in accordance with the navigation data obtained from the GPS signal received by the GPS terminal, and divides, when the received electric field is less than the threshold level, the GPS data in accordance with the navigation data supplied from the external system.

5. The Global Positioning System according to claim 4, further comprising a position determining section for determining position of the GPS terminal from the pseudo range and the navigation data extracted from the GPS signal received by the GPS terminal when the received electric field is greater than a threshold level, and supplied from the external system when the received electric field is less than the threshold level.

6. The Global Positioning System according to claim 1, wherein said GPS terminal further comprises a position determining section for determining position of the GPS terminal from the pseudo range obtained by the GPS terminal and the navigation data received by the external system.

7. The Global Positioning System according to claim 2, wherein said means for shifting divisions of the data blocks shifts the divisions of the data blocks by a predetermined amount if the correlation peak is less than a threshold level to enable detection of the correlation peak.

8. The Global Positioning System according to claim 2, wherein said means for shifting divisions of the data blocks shifts the divisions of the data blocks roughly at a first step, and then slightly at a second step to converge to the correlation peak.

9. The Global Positioning System according to claim 1, wherein the Doppler correction section carries out Doppler correction of the C/A code sequence in the GPS signal received by the GPS terminal using the Doppler information obtained from the navigation data supplied by one of the GPS terminal and the external system.

10. The Global Positioning System according to claim 1, wherein said Doppler correction section carries out a Doppler correction of the C/A code sequence by Doppler correction of the GPS signal received by the GPS terminal.

11. The Global Positioning System according to claim 4, wherein the received electric field detector changes a correlation calculation interval in response to the electric field level detected.

12. The Global Positioning System according to claim 4, wherein the received electric field detector changes a summation interval in response to the electric field level detected.

13. A Global Positioning System (GPS) terminal connected through a communication medium to an external system that receives a GPS signal from a satellite and extracts navigation data and Doppler information from the GPS signal, wherein the GPS terminal receives the GPS signal from the satellite, and each bit of the navigation data includes a plurality of PN frames, each PN frame including many chips arranged in a pattern, said GPS terminal comprising:

a frequency converter for converting frequency of the GPS signal received by the GPS terminal;

an analog-to-digital (A/D) converter for converting the GPS signal passing through the frequency converter into corresponding GPS data;

a memory for storing the GPS data as stored GPS data for a time interval;

a Doppler correction section for Doppler correction of the stored GPS data to produce Doppler corrected data, using Doppler information from one of the GPS terminal and the external system;

means for sequentially dividing the Doppler corrected data into a plurality of data blocks with a length of a navigation data bit in accordance with navigation data supplied from one of the GPS terminal and the external system;

means for calculating, for each of the data blocks, a cumulative sum of chips for corresponding positions in individual PN frames in the data block;

means for multiplying each cumulative sum by a corresponding navigation data bit and for outputting a plurality of products of the cumulative sums and the navigation data bits;

means for summing the plurality of products for respective chip positions; and means for computing correlation between a set of sums of the products and a PN code sequence generated in the GPS terminal, and for calculating a pseudo range between the GPS terminal and the satellite from a correlation peak at a maximum correlation.

14. A Global Positioning method in a system including an external system that receives a Global Positioning System (GPS) signal from a satellite and extracts navigation data and Doppler information from the GPS signal, and a GPS terminal that is connected to the external system through a communication medium and receives the GPS signal from the satellite, wherein each bit of the navigation data includes a plurality of PH frames, each PN frame including many chips arranged in a pattern, said Global Positioning method comprising:

converting frequency of the GPS signal received by the GPS terminal;

analog-to-digital converting the GPS signal, after converting frequency, into corresponding GPS data;

storing the GPS data for a time interval as stored GPS data;

Doppler correcting the stored GPS data to produce Doppler corrected data, using Doppler information from one of the GPS terminal and the external system;

sequentially dividing the Doppler corrected data into a plurality of data blocks with a length of a navigation data bit in accordance with navigation data supplied from one of the GPS terminal and the external system;

calculating for each of the data blocks a cumulative sum of chips at corresponding positions in individual PN frames in the data block;

multiplying each cumulative sum by a corresponding navigation data bit, and outputting a plurality of products of the cumulative sums and the navigation data bits;

summing the plurality of products for respective chip positions;

computing correlation between a set of sums of the products and a PN code sequence generated in the GPS terminal; and calculating a pseudo range between the GPS terminal and the satellite from a correlation peak at a maximum correlation.

* * * * *